(12) United States Patent
O'Quin

(10) Patent No.: US 7,090,230 B2
(45) Date of Patent: Aug. 15, 2006

(54) SHOPPING CART CHASSIS

(75) Inventor: Taft O'Quin, Inola, OK (US)

(73) Assignee: Unarco Industries, Inc., Wagoner, OK (US)

( * ) Notice: Subject to any disclaimer, the term of this patent is extended or adjusted under 35 U.S.C. 154(b) by 0 days.

(21) Appl. No.: 10/937,024

(22) Filed: Sep. 9, 2004

(65) Prior Publication Data

US 2006/0049590 A1   Mar. 9, 2006

(51) Int. Cl.
*B62D 39/00* (2006.01)

(52) U.S. Cl. .......................... 280/33.991; 280/33.992; 280/33.997

(58) Field of Classification Search .......... 280/33.991, 280/33.992, 33.995, 33.997, 33.998, 47.19, 280/47.34, 638, 35, 651, 652, 47.35, 781, 280/782

See application file for complete search history.

(56) References Cited

U.S. PATENT DOCUMENTS

| 3,909,034 | A | * | 9/1975 | Trubiano | 280/47.34 |
| 5,072,956 | A | * | 12/1991 | Tannehill et al. | 280/33.992 |
| 5,158,310 | A | * | 10/1992 | Tannehill et al. | 280/33.992 |
| 5,324,055 | A | * | 6/1994 | Trubiano | 280/33.995 |
| 5,505,472 | A | * | 4/1996 | Trubiano | 280/33.993 |
| 5,553,876 | A | * | 9/1996 | Trubiano | 280/33.991 |
| 6,641,147 | B1 | * | 11/2003 | Werner | 280/33.991 |

* cited by examiner

*Primary Examiner*—Hau Van Phan
(74) *Attorney, Agent, or Firm*—Wood, Phillips, Katz, Clark & Mortimer

(57) ABSTRACT

A shopping cart chassis is provided with at least one tubular frame member. At least a first part of the length of the frame member has a wall with a hollow cylindrical configuration defining an annular transverse cross-section. At least a second part of the length of frame member has a wall with a hollow configuration defining an elongate transverse cross-section having a longer dimension and a shorter dimension. A second part of the frame member is oriented so that the longer dimension of the elongate transverse cross-section is generally parallel to the direction of the force of gravity when the shopping cart is in its normal use orientation.

10 Claims, 2 Drawing Sheets

SHOPPING CART CHASSIS

FEDERALLY SPONSORED RESEARCH OR DEVELOPMENT

Not Applicable

REFERENCE TO A MICROFICHE APPENDIX

Not Applicable

TECHNICAL FIELD

This invention pertains to a shopping cart which has a chassis constructed from one or more tubular frame members.

BACKGROUND OF THE INVENTION AND TECHNICAL PROBLEMS POSED BY THE PRIOR ART

A conventional shopping cart has a one-piece or multi-piece chassis that is mounted to swivel casters and that typically supports at least a wire or polymer basket. One such conventional shopping cart design is illustrated in the U.S. Patent Publication US 2004/0084863 A1 published on May 6, 2004 by the U.S. Patent and Trademark Office. The chassis for that cart is fabricated from a plurality of tubular frame members.

The tubular frame members are conventionally formed from hollow, steel tubing, and the frame members are preferably and typically connected or joined together by welding.

Another shopping cart design has a chassis formed from a single length of tubing that is bent into the desired configuration.

The cost of the shopping cart is dependent upon, among other things, the amount of the steel that is used in the tubular frame member or members of the chassis. It would be desirable to provide an improved design for a shopping cart or a portions of shopping cart in which the amount of steel in one or more tubular frame members could be minimized, or at least reduced.

It would be particularly desirable to provide an improved design in which the wall thickness of a hollow tubular frame member could be reduced, at least over a portion or portions of the length of the tubular frame member.

Because shopping carts are typically subjected to various dynamic and static loads, including loads imposed by goods being carried, as well as by loads resulting from impacts, it would be advantageous to provide an improved design for a shopping cart chassis or portions thereof wherein the chassis could withstand the anticipated dynamic and static loads without failure or other damage.

Although it would be beneficial to provide an improved design for a shopping cart chassis (or portions thereof) that could be made from a tubular frame member having a reduced amount of steel or other structural material, it would also be desirable to provide such an improved design that can employ tubing that is of a conventional type which is readily available in the tubing market—rather than requiring special non-stock tubing.

The present invention provides an improved shopping cart chassis which can accommodate designs having the above-discussed benefits and features.

BRIEF SUMMARY OF THE INVENTION

A novel arrangement for at least a portion of a shopping cart chassis is provided which can reduce material costs while providing a chassis structure that can withstand the anticipated dynamic and static loads.

Further, the novel chassis arrangement of the present invention may be made with stock tubing that is readily available from tubing manufacturers.

The improved design readily accommodates the connection of one load-bearing portion of a tubular frame member to another portion of the same tubular frame member in the chassis.

The improved design can be relatively and easily manufactured without requiring the use of unusual and expensive manufacturing techniques.

The improved design can withstand the anticipated dynamic and static loads imposed on the chassis.

According to one aspect of the invention, a shopping cart chassis is provided with at least one tubular frame member. At least a first part of the length of the frame member has a wall with a hollow cylindrical configuration defining an annular transverse cross-section. At least a second part of the length of the frame member has a wall with a hollow configuration defining an elongated transverse cross-section having a longer dimension and a shorter dimension. The second part of the frame member is oriented so that the longer dimension of the elongate transverse cross-section is generally parallel to the direction of the force of gravity when the shopping cart is in its normal use orientation.

In a presently preferred embodiment, the frame member second part wall that defines the elongated transverse cross-section has two spaced-apart, parallel straight sections joining two semi-circular sections.

In a preferred form of a chassis incorporating the invention, the chassis frame member has one or more bends so that one or more portions of the frame member are adjacent to each other at a location or locations where the portions can be connected. In one preferred embodiment there is one connection of one part of the frame member to another part of the frame member. In particular, the frame member has at least a first part that includes a first connection portion, and the frame member has at least a second part that includes a second connection portion. Each first and second connection portion defines a generally longitudinal central axis. The first connection portion is disposed adjacent the second connection portion so that the longitudinal central axes of the connection portions are aligned generally parallel. A weld joins the first connection portion with the second connection portion to provide a strong chassis.

The novel structure of the present invention permits the use of a tubular frame member with a reduced thickness wall. This requires less material, and reduces costs. The flexural rigidity of one part of the frame member in a particular loading direction of interest may actually be increased even though the flexural rigidity of that part of the tubular frame member with respect to a certain other loading directions may be decreased where higher flexural rigidity is not required because the loading in such other directions is not anticipated to be as high, or where the chassis otherwise provides increased strength or rigidity as a result of connection with another portion of the tubular frame member or with a reinforcing member of the chassis. However, by appropriate orientation of an elongate transverse cross-section of the one part of the tubular frame member, the one part of the tubular frame member can exhibit sufficient flexural rigidity in a desired direction where needed to accommodate the imposed load.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

DETAILED DESCRIPTION

While this invention is susceptible of embodiment in many different forms, this specification and the accompanying drawings disclose only one specific form as an example of the invention. The invention is not intended to be limited to the embodiment so described, however. The scope of the invention is pointed out in the appended claims.

For ease of description, a shopping cart incorporating this invention is described in the normal (upright) operating (use) position, and terms such as upper, lower, horizontal, etc., are used with reference to this position. It will be understood, however, that a shopping cart incorporating this invention may be manufactured, stored, transported, used, and sold in an orientation other than the position described.

Figures illustrating the shopping cart show some mechanical elements that are known and that will be recognized by one skilled in the art. Detailed descriptions of such elements are not necessary to an understanding of the invention, and accordingly, are herein presented only to the degree necessary to facilitate an understanding of the novel features of the present invention.

Figure 1:
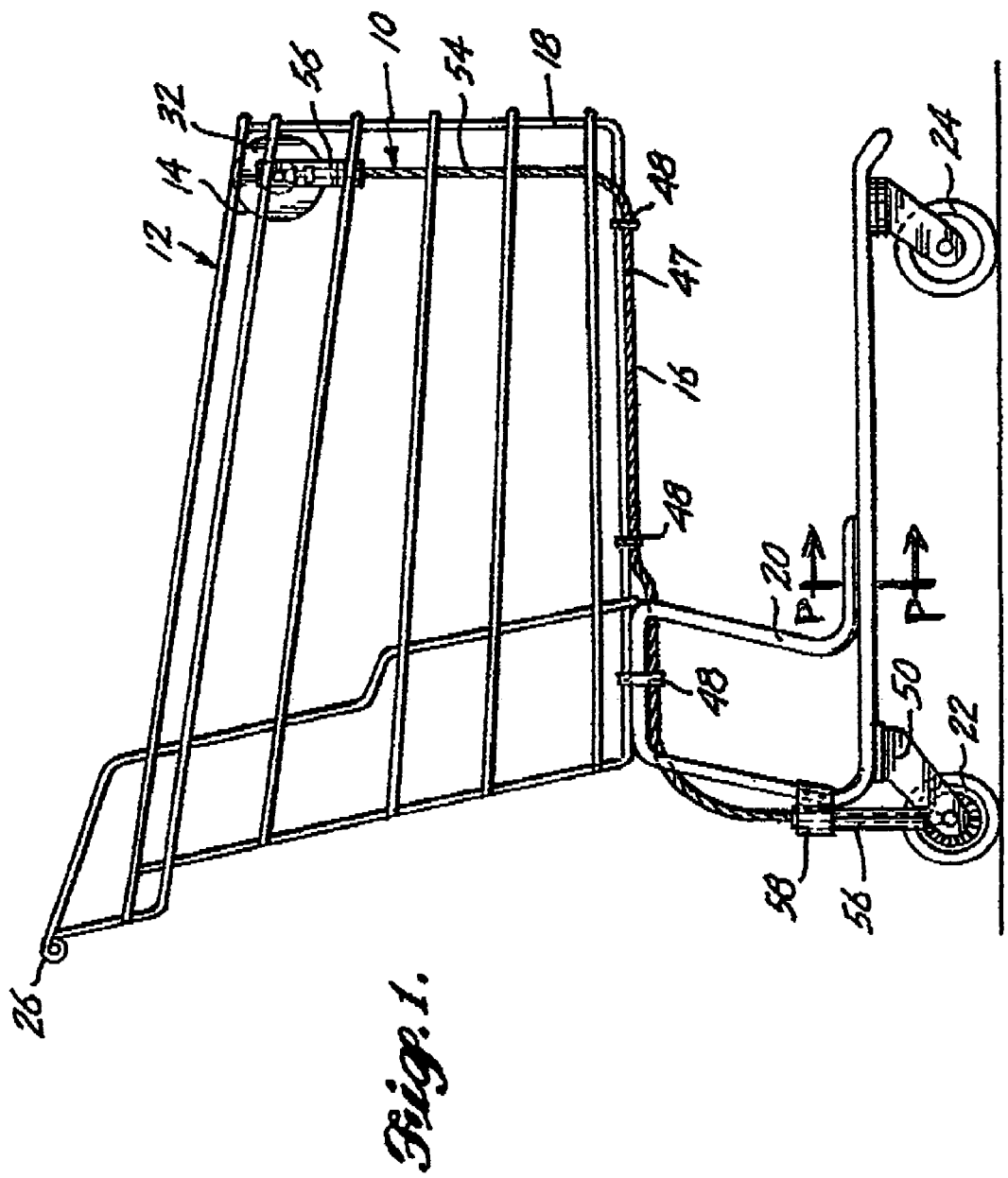
FIG. 1 is a perspective view of a shopping cart which incorporates a chassis embodying the present invention.

FIG. 1 illustrates a shopping cart 10 which includes a chassis 12 of the present invention. The chassis 12 is mounted to four wheel assemblies or casters 14, and the chassis supports an upper basket 16 and a handle structure 18. Mounted to the lower portion of the chassis 12 is a lower rack or platform 20. The casters 14, basket 16, handle structure 18, and lower rack 20 may be of any suitable conventional or special design, the details of which form no part of the present invention. Further, some features, such as a lower rack 20, may be omitted in certain applications.

Figure 2:
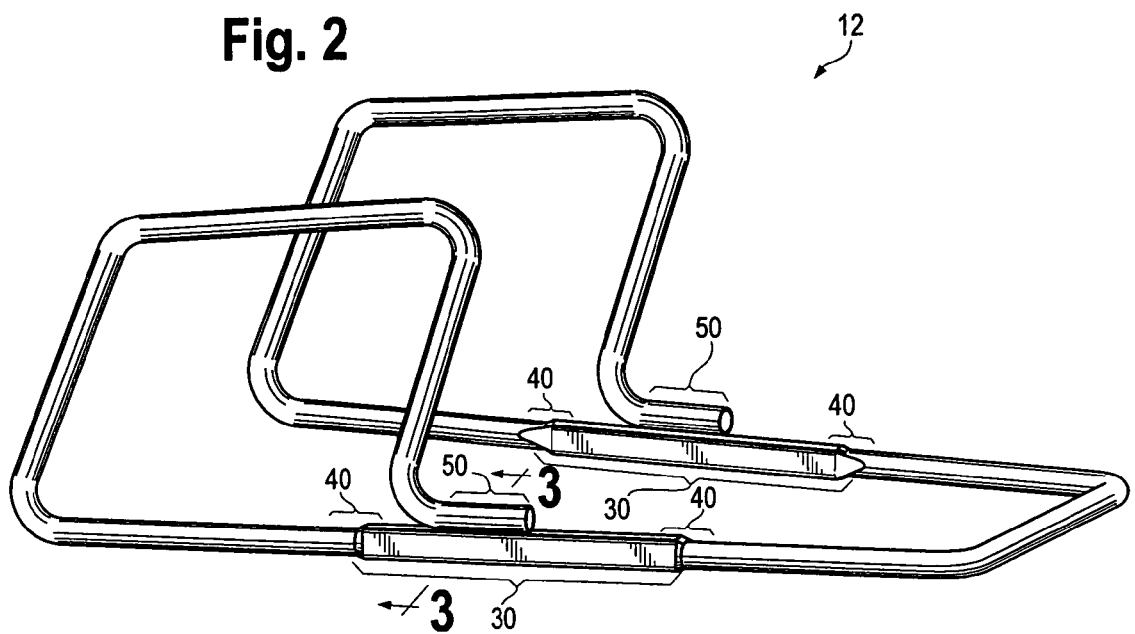
FIG. 2 is a perspective view of the chassis of the shopping cart shown in FIG. 1.

The chassis 12 is illustrated separately in FIG. 2. The chassis 12, in the preferred embodiment illustrated in FIG. 2, is formed from a single tubular frame member which is bent and cold-formed as necessary to provide the illustrated configuration.

Figure 3:
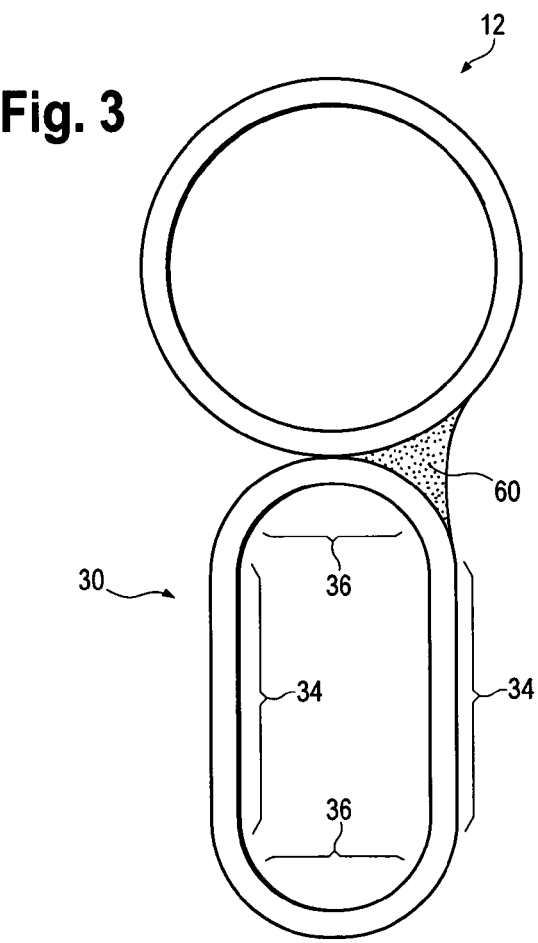
FIG. 3 is a transverse cross-sectional view taken generally along the plane 3—3 in FIG. 2.
Figure 1:

In a presently preferred, contemplated, commercial embodiment, the chassis 12 is a single, tubular frame member consisting of plain carbon steel tubing which, after welding as described in detail hereinafter, may be chrome-plated or powder-coated. In a presently contemplated, preferred, commercial embodiment, the tubular frame member is initially provided as nominal one inch outside diameter, 14 gauge round tubing of a predetermined length. The wall thickness of the tubing, prior to any bending or other cold-forming processes, is about 0.070 inch. Prior to bending and forming the tubular frame member into the configuration of the chassis 12 illustrated in FIG. 2, one or more parts, sections, or regions 30 of the length of the frame member are cold-formed to alter the transverse cross-section of the tubular frame. As shown in FIG. 3, each part, section, or region 30 of the tubular frame member has an elongate transverse cross-section having a longer dimension and a shorter dimension. The longer dimension is generally parallel to the direction of the force of gravity when the shopping cart is in its normal use orientation. In a presently preferred, contemplated, commercial embodiment, the tubular frame member wall that defines the elongate transverse cross-section has two spaced-apart, parallel, straight sections 34 joining two semi-curricular sections 36.

Each elongate transverse cross-section part, section, or region 30 of the tubular frame member of the chassis 12 is about 13 inches long in the presently preferred, contemplated, commercial embodiment. The elongate transverse cross-section regions 30 of the tubular frame member may be conveniently formed in a conventional incline press by cold-forming the tubular wall into the elongate cross-sectional configuration. Both regions 30 of the chassis 12 may be cold-formed simultaneously in an appropriately configured incline press. Other manufacturing techniques could also be used to form the elongated transverse cross-section regions 30.

As it can be seen in FIG. 2, at each end of each elongate transverse cross-section region 30, there is a transition portion 40 connecting the elongate transverse region 30 with the remaining, annular transverse cross-section of the adjacent portions of the tubular frame member of the chassis 12.

The remaining portions of the chassis tubular frame member which extend beyond the elongate transverse cross-section regions 30 and transition portions 40 have a generally uniform, annular cross-section, but are bent as necessary to form the overall configuration of the chassis 12. In particular, in a presently preferred, contemplated, commercial embodiment, at least each end portion, end part, or end segment 50 (FIG. 2) extends from a bend and is disposed generally horizontally so that it is parallel to one of the elongate transverse cross-section regions 30. Each end portion 50 is disposed on top of one of the regions 30 as shown in FIGS. 2 and 3, and a weld 60 (FIG. 3) joins the tube regions 30 and tube end portions 50. The weld 60 is preferably located on the inside portion of the chassis 12. The weld 60 could also be located on the outside portion of the chassis 12, or welds 60 could be provided both on the inside and on the outside of the chassis. In the presently preferred, contemplated, commercial embodiment, the weld 60 is a metal inert gas weld that extends for about 1.5 inches in length along the tubing.

The chassis 12 illustrated in the figures is a single, unitary length of a tubular frame member (i.e., tubing). It will be appreciated that in other alternative designs (not illustrated), the chassis 12 could comprise two or more separate, tubular frame members. However, in the preferred form of the present invention, the chassis 12 includes only a single, unitary, tubular frame member, and this has the advantage of minimizing, or at least reducing, the number of connections or joints that exist in the chassis 12.

The novel chassis 12 of the present invention, when made as described above, permits the use of stock tubing that is readily available from tubing manufacturers. Further, the chassis 12 accommodates the connection of one load bearing portion of the tubular frame member to another portion of the same tubular frame member in the chassis without requiring the use of unusual and expensive manufacturing techniques.

Further, the chassis 12 permits the use of a tubular frame member with a reduced wall thickness that requires less material and thus reduces costs. Flexural rigidity of one part of the frame member in a particular loading direction of interest may actually be increased even though the flexural rigidity of that part of the tubular frame member with respect to certain other loading directions may be decreased (in such other loading directions where higher flexural rigidity is not required because the loading in such other directions is not anticipated to be as high, or where the chassis otherwise provides increased rigidity as a result of a connection with another portion of the tubular frame member or with a reinforcing member of the chassis).

By appropriate orientation of the elongate transverse cross-section portion of the tubular frame member, that portion of the frame member can exhibit sufficient flexural rigidity in a desired direction where needed to accommodate the imposed load. For descriptive purposes, the tubular frame member used in the preferred, contemplated, commercial embodiment may be characterized as having a first part that includes the end region 50 that may be regarded as a "first connection portion" 50, and the tubular frame member may be further characterized as having a second part that includes at least some of the length of the elongate transverse cross-section region 30 that may be regarded as a "second connection portion" 30. The first connection portion 50 and second connection portion 30 may each then be characterized as defining a generally longitudinal central axis. The first connection portion 50 is disposed on top of the second connection portion 30 so that the longitudinal central axes of each connection portion 50 and 30 is aligned and generally parallel. If the frame member portion 30 is oriented so that the longer dimension of the elongate transverse cross-section is generally parallel to the direction of force of gravity when the shopping cart is in its normal use orientation, the chassis 12 can withstand the intended (i.e., "design") loading in the vertical direction (e.g., including the weight of the basket 16 and contents that may be placed therein).

The inventors have conducted strength tests of the illustrated chassis 12, and have compared the test results with results from identical tests performed on a comparison chassis having a similar configuration except that the comparison chassis tubular frame member had an annular cross-section over its entire length and had no portion with an elongated transverse cross-section. Those tests showed that the chassis of the present invention, when formed from 14 gauge steel tubing, was stronger in the vertical direction than the comparison chassis formed from thicker, 12 gauge steel tubing. The 12 gauge tubing wall thickness is about 0.095 inch, whereas the 14 gauge tubing wall thickness is only about 0.070 inch.

The strength of the chassis of the present invention, and the strength of the comparison chassis were measured under static loading in the vertical direction (i.e., parallel to the direction of gravity when the chassis is in its normal use orientation), and the amount of loading or force to cause a one quarter inch permanent deflection was measured. For the chassis of the present invention formed from 14 gauge steel, the loading at one quarter inch permanent deflection was 1050 pounds, whereas the comparison chassis formed from 12 gauge tubing (which was round over its entire length) could withstand only 900 hundred pounds load before reaching one quarter inch permanent deflection.

In the presently preferred, proposed, commercial embodiment of the invention, the outside diameter of the annular wall portions of the tubular frame member is about 1.0 inch. In each of the deformed portions or regions 30, the total height of the elongate, transverse cross-section is 1.25 inches, and the total width of the elongate, transverse cross-section is 0.675 inch. The wall thickness of each elongate, transverse cross-section portion 30, after its deformation from the original annular configuration of the round stock tubing, is still about 0.070 inch. The length of each portion 30 is about 13 inches.

It will be readily apparent from the foregoing detailed description of the invention and from the illustrations thereof that numerous variations and modifications may be effected without departing from the

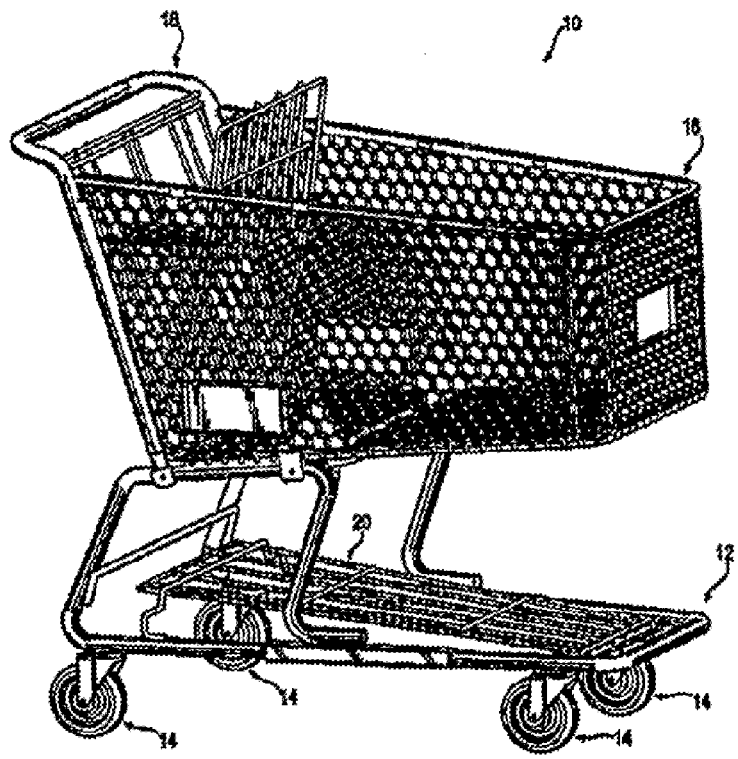

What is claimed is:

1. A shopping cart chassis comprising:
    at least one tubular frame member that has a length and at least one lengthwise bend and wherein
    at least a first part of the length of said frame member has a wall with a hollow cylindrical configuration defining an annular transverse cross-section;
    at least a second part of the length of said frame member has a wall with a hollow configuration defining an elongate transverse cross-section having a longer dimension and a shorter dimension;
    said second part of said frame member is oriented so that said longer dimension of said elongate transverse cross-section is generally parallel to the direction of the force of gravity when said shopping cart is in its normal use orientation;
    said frame member first part includes a first connection portion;
    said frame member second part includes a second connection portion;
    said first and second connection portions each define a generally longitudinal central axis;
    said first connection portion is disposed on top of said second connection portion with said longitudinal central axes of each connection portion aligned generally parallel; and
    a weld joins said first connection portion with said second connection portion.

2. The chassis in accordance with claim 1 in which said frame member second part wall that defines said elongate transverse cross section has two spaced-apart parallel straight sections joining two semi-circular sections.

3. The chassis in accordance with claim 1 in which
    said first part of said frame member has a generally uniform wall thickness;
    said first part wall thickness and said second part wall thickness are substantially equal.

4. The chassis in accordance with claim 1 in which said frame member is steel.

5. The chassis in accordance with claim 1 in which said frame member has at least one transition portion connecting the annular transverse cross section of said first part with the elongate transverse cross section of said second part.

6. A shopping cart chassis comprising:
    at least one tubular frame member wherein
    at least a first part of the length of said frame member has a wall with a hollow cylindrical configuration defining an annular transverse cross-section;
    at least a second part of the length of said frame member has a wall with a hollow configuration defining an elongate transverse cross-section having a longer dimension and a shorter dimension; and said second part of said frame member is oriented so that said longer dimension of said elongate transverse cross-section is generally parallel to the direction of the force of gravity when said shopping cart is in its normal use orientation; wherein said frame member has a least one transition portion connecting the annular transverse cross section of said first part with the elongate transverse cross section of said second part.

7. The chassis in accordance with claim 6 in which said frame member second part wall that defines said elongate transverse cross section has two spaced-apart parallel straight sections joining two semi-circular sections.

8. The chassis in accordance with claim 6 in which
said first part of said frame member has a generally uniform wall thickness;
said second part of said frame member has a generally uniform wall thickness; and
said first part wall thickness and said second part wall thickness are substantially equal.

9. The chassis in accordance with claim 6 in which
said frame member has at least one lengthwise bend;
said frame member first part includes a first connection portion;
said frame member second part includes a second connection portion;
said first and second connection portions each define a generally longitudinal central axis;
said first connection portion is disposed adjacent said second connection portion with said longitudinal central axes of each connection portion aligned generally parallel; and
a weld joins said first connection portion with said second connection portion.

10. The chassis in accordance with claim 6 in which said frame member is steel.

* * * * *

UNITED STATES PATENT AND TRADEMARK OFFICE
CERTIFICATE OF CORRECTION

| | | |
|---|---|---|
| PATENT NO. | : 7,090,230 B2 | |
| APPLICATION NO. | : 10/937024 | |
| DATED | : August 15, 2006 | |
| INVENTOR(S) | : Taft O'Quin | |

It is certified that error appears in the above-identified patent and that said Letters Patent is hereby corrected as shown below:

The title page showing the illustrative figure should be deleted and substitute with the attached title page.

The drawing sheet, consisting of Fig. 1, should be deleted and replaced with drawing sheet, consisting of Fig. 1, as shown on the attached page.

Signed and Sealed this

Sixteenth Day of October, 2007

JON W. DUDAS
*Director of the United States Patent and Trademark Office*

(12) United States Patent (10) Patent No.: US 7,090,230 B2
O'Quin (45) Date of Patent: Aug. 15, 2006

(54) SHOPPING CART CHASSIS

(75) Inventor: Taft O'Quin, Inola, OK (US)

(73) Assignee: Unarco Industries, Inc., Wagoner, OK (US)

( * ) Notice: Subject to any disclaimer, the term of this patent is extended or adjusted under 35 U.S.C. 154(b) by 0 days.

(21) Appl. No.: 10/937,024

(22) Filed: Sep. 9, 2004

(65) Prior Publication Data

US 2006/0049590 A1 Mar. 9, 2006

(51) Int. Cl.
*B62D 39/00* (2006.01)

(52) U.S. Cl. .................. 280/33.991; 280/33.992; 280/33.997

(58) Field of Classification Search .......... 280/33.991, 280/33.992, 33.995, 33.997, 33.998, 47.19, 280/47.34, 538, 35, 651, 652, 47.35, 781, 280/782
See application file for complete search history.

(56) References Cited

U.S. PATENT DOCUMENTS

| | | | | |
|---|---|---|---|---|
| 3,909,034 A | * | 9/1975 | Trubiano | 280/47.34 |
| 5,072,956 A | * | 12/1991 | Tannehill et al. | 280/33.992 |
| 5,158,310 A | * | 10/1992 | Tannehill et al. | 280/33.992 |
| 5,324,055 A | * | 6/1994 | Trubiano | 280/33.995 |
| 5,505,472 A | * | 4/1996 | Trubiano | 280/33.993 |
| 5,553,876 A | * | 9/1996 | Trubiano | 280/33.991 |
| 6,641,147 B1 | * | 11/2003 | Werner | 280/33.991 |

* cited by examiner

*Primary Examiner*—Hau Van Phan
(74) *Attorney, Agent, or Firm*—Wood, Phillips, Katz, Clark & Mortimer

(57) ABSTRACT

A shopping cart chassis is provided with at least one tubular frame member. At least a first part of the length of the frame member has a wall with a hollow cylindrical configuration defining an annular transverse cross-section. At least a second part of the length of frame member has a wall with a hollow configuration defining an elongate transverse cross-section having a longer dimension and a shorter dimension. A second part of the frame member is oriented so that the longer dimension of the elongate transverse cross-section is generally parallel to the direction of the force of gravity when the shopping cart is in its normal use orientation.

10 Claims, 2 Drawing Sheets